United States Patent [19]

Meyer et al.

[11] Patent Number: 4,827,706
[45] Date of Patent: May 9, 1989

[54] COMBINED SPREADING AND SIFTING DEVICE FOR LEVELING SOIL

[76] Inventors: Dennis W. Meyer, Rte. 4, Box 110A, Willmar, Minn. 56201; David W. Klienhuizen, 18431 Henna Ave., N., Forest Lake, Minn. 55025

[21] Appl. No.: 134,188
[22] Filed: Dec. 15, 1987
[51] Int. Cl.$^4$ .............................................. A01D 7/00
[52] U.S. Cl. ................................................... 56/400.05
[58] Field of Search ............ 56/400.01, 400.05, 400.06; 172/32, 377, 612, 371, 375, 378, 380, 684.5, 379

[56] References Cited

U.S. PATENT DOCUMENTS

| | | | |
|---|---|---|---|
| 1,108,126 | 8/1914 | Boyd | 172/684.5 |
| 1,166,107 | 12/1915 | Arex | 52/671 |
| 1,384,220 | 7/1921 | Sykes | 172/378 |
| 1,530,329 | 3/1925 | Roberts | 172/612 |
| 1,569,421 | 1/1926 | Coelho | 172/612 |
| 2,308,855 | 1/1943 | Bartsch | 52/671 |
| 2,887,170 | 5/1959 | Fenicchia | 56/400.05 |
| 3,106,969 | 10/1963 | Carter | 172/684.5 |
| 3,146,831 | 9/1964 | McConnell | 56/400.04 |
| 3,225,837 | 12/1965 | Richards | 172/371 |
| 4,052,800 | 10/1977 | Fuhrboter et al. | 172/612 |

Primary Examiner—Paul J. Hirsch
Attorney, Agent, or Firm—Peterson, Wicks, Nemer and Kamrath

[57] ABSTRACT

The leveling device includes a panel of expanded metal that is maintained in a planar or flat condition by means of a plurality of laterally spaced fins, the expanded metal being welded to the lower edges of the fins. Welded to the upper edges of the fins and extending transversely thereacross are two rods to which is centrally secured an angle member or bracket. One flange portion of the angle member has welded thereto the lower end of a tubular handle. A combined spreading and sifting action is derived by moving the device back and forth across the soil to be leveled, some of the material being scooped onto the upper side of the panel between the various fins where it remains if too large to be sifted downwardly through the diamond-shaped openings in the panel of expanded metal.

16 Claims, 3 Drawing Sheets

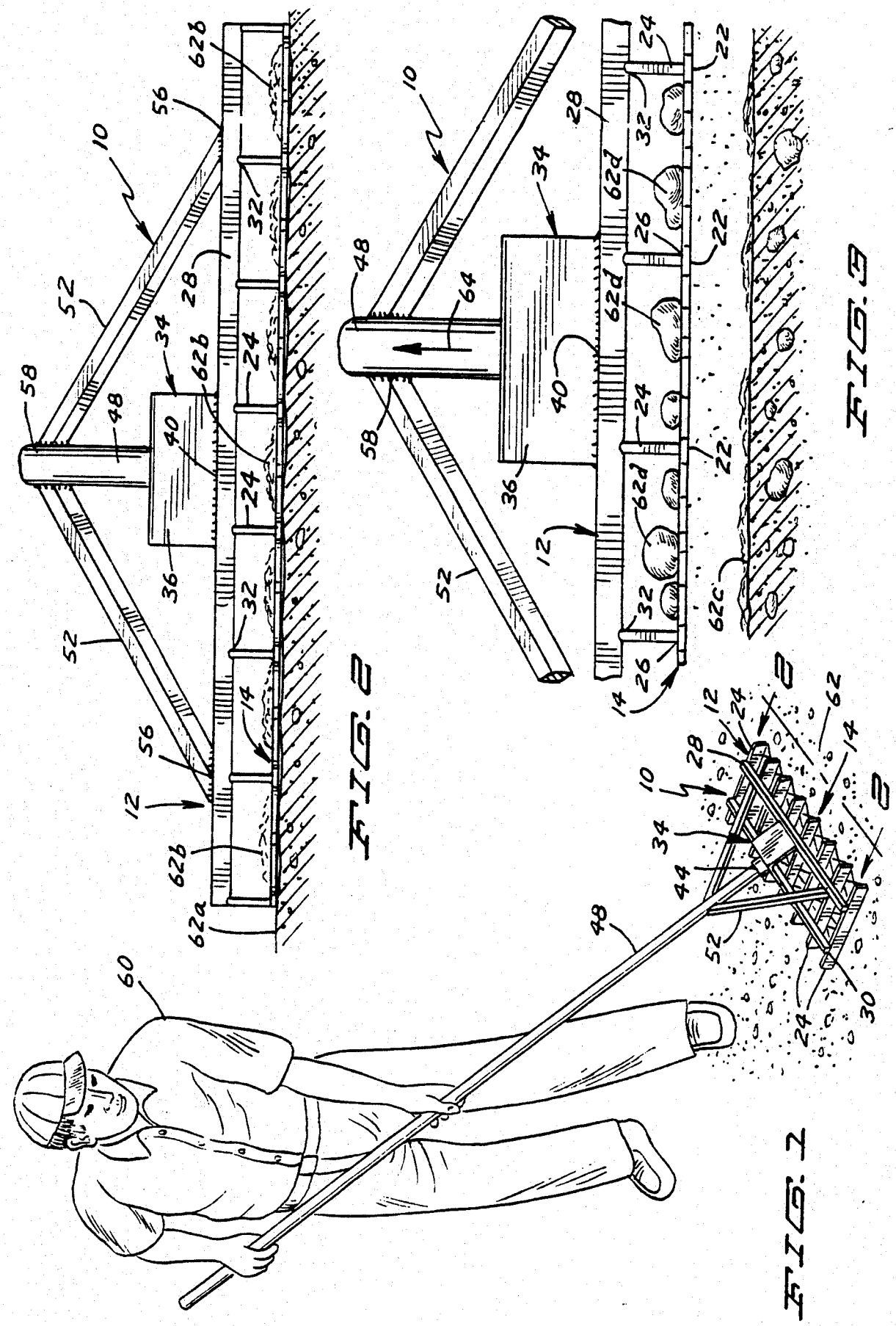

COMBINED SPREADING AND SIFTING DEVICE FOR LEVELING SOIL

BACKGROUND OF THE INVENTION

1. Field of Invention

This invention relates generally to hand-held soil leveling apparatus, and pertains more particularly to a leveling device that not only spreads the soil but at the same time performs a sifting operation.

2. Description of the Prior Art

A conventional lawn rake is perhaps the most common implement used by both do-it-yourself and professional gardeners for preparing soil for planting. The shortcomings of such rakes have been recognized. For example, U.S. Pat. No. 2,887,170 granted on May 19, 1959 to Stephen V. Fenicchia for "GARDENING TOOL" has addressed this problem. As a matter of fact, the patented tool is intended to be attached to a common hand rake. While the leveling and breaking up of lumps can be to some extent achieved, there is no sifting accompanying the breaking up of the clumps during the leveling process. Virtually the same thing can be said for what is disclosed in U.S. Pat. No. 1,569,421 issued on Jan. 12, 1926 to Manuel T. Coelho for "LAWN DRESSING IMPLEMENT." Actually, any effective sifting is thwarted by reason of forwardly and rearwardly inclined plates. Another patent for spreading and leveling soil is U.S. Pat. No. 3,225,837 granted on Dec. 28, 1965 to Ronald G. Richards for "DEVICE FOR SPREADING MATERIALS ON LAWNS OR FOR LEVELING SOFT SOIL AND THE LIKE." In this patent, transversely extending and longitudinally spaced bars are employed; owing to the spacing between the bars no sifting can occur. Another patent to take into consideration is U.S. Pat. No. 3,146,831 granted on Sept. 1, 1964 to John W. McConnell for "RAKE FOR MAINTENANCE OF SAND TRAPS AND PUTTING GREENS OF GOLF COURSES." The rake described in this patent is designed, just as a portion of the title indicates, for grooming sand traps. While the rake does make use of expanded metal, the metal is rolled into a concavo-convex configuration which renders the rake suitable for fluffing up the loose sand of a trap, but the curvature imparted to the expanded metal makes the rake unsuitable for spreading soil and leveling because a wavy and uneven appearance results. Also, no sifting action is intended. When dressing putting greens, the rake head is turned over and employed in a hoe-like manner.

SUMMARY OF THE INVENTION

A general object of our invention is to provide a device that will effectively and efficiently impart an extremely smooth and flat appearance to the loose soil being leveled.

Another object of the invention is to provide a device that will perform a sifting and separating function as the spreading of the soil takes place. More specifically, stones, clumps of clay and the like must be removed, and an aim of our invention is to separate out material of objectionable size that cannot be readily broken up during the leveling process.

Still another object of the invention is to provide a leveling device that will be lightweight, inexpensive to manufacture, and exceedingly rugged so that it will last indefinitely.

A more specific object is to provide a device of the foregoing character that will find especial utility in the pulverizing of plugs that are removed from golf course greens for aerating purposes. In this regard, the plugs, once they are removed, leave core holes that should be refilled. All that need be done when using our device is to move the head of the device back and forth over the removed plugs with the consequence that they are broken up and the thus pulverized soil returned to the various core holes during the back and forth head movement.

Briefly, our invention envisages a panel of expanded sheet metal that is retained in a flat condition by means of a plurality of laterally spaced fins that act much like rudders. The expanded metal is secured to the lower edges of the fins. Inasmuch as the panel of expanded metal is quite thin, when the device is moved back and forth over the loose soil to be leveled, some of the soil, along with stones, clumps of clay and other debris, will literally be shoveled onto the upper side of the expanded metal. Whatever is of sufficiently small size will pass downwardly through the diamond-shaped openings in the expanded metal and the thus sifted material will then be spread evenly over the area being leveled along with the soil that is not lifted onto the upper side of expanded metal. However, sufficiently coarse material remains on top of the expanded metal. Such oversized material, such as stones and clumps of clay, can readily be discarded by the user of our device whenever there is a sufficient accumulation to warrant its disposal.

BRIEF DESCRIPTION OF THE DRAWINGS

FIG. 1 is a perspective view showing our leveling device in actual use;

FIG. 2 is an enlarged view taken in the direction of line 2—2 of FIG. 1, thereby showing the soil being leveled in section with our device in elevation thereabove;

FIG. 3 is a fragmentary view of our device on an even larger scale than in FIG. 2 with the head of the device raised and with the stones and other oversized material too large to pass downwardly through the openings of the expanded metal being retained on the upper side of the expanded metal prior to being discarded;

DESCRIPTION OF THE PREFERRED EMBODIMENT

Figure 4:
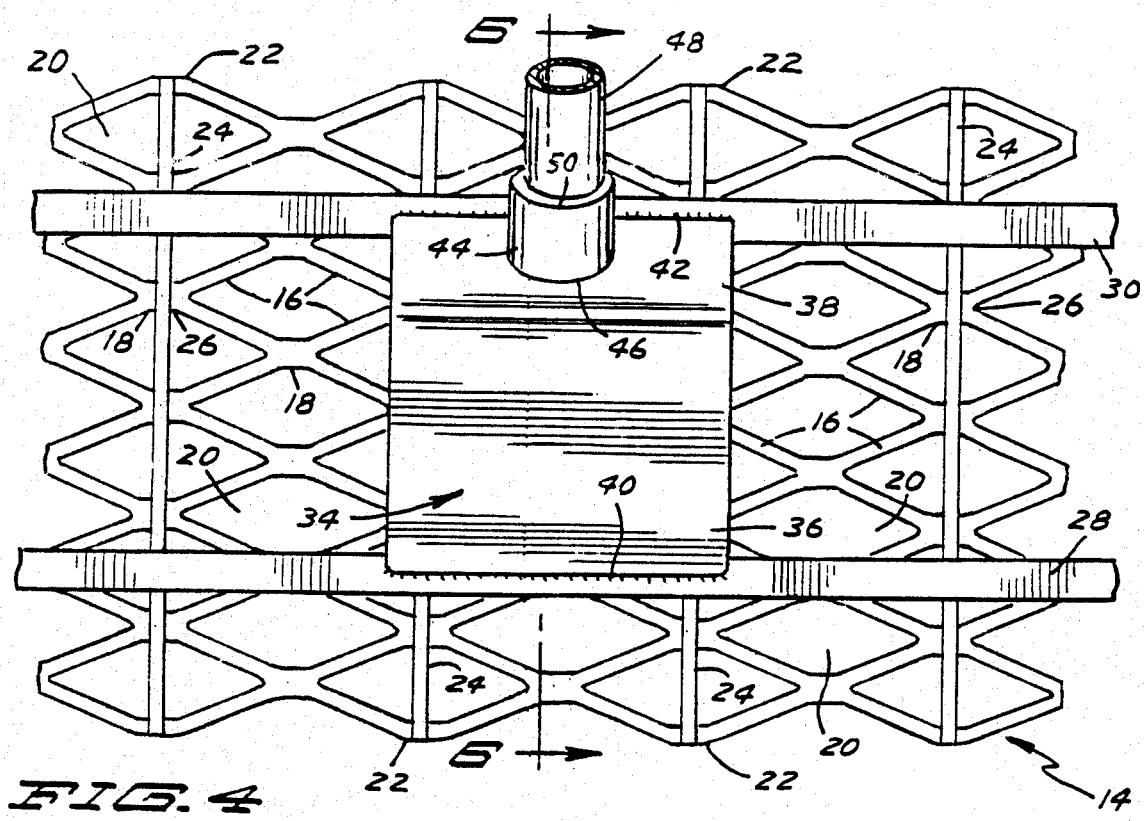
FIG. 4 is a top plan view corresponding to FIG. 3.
Figure 5:
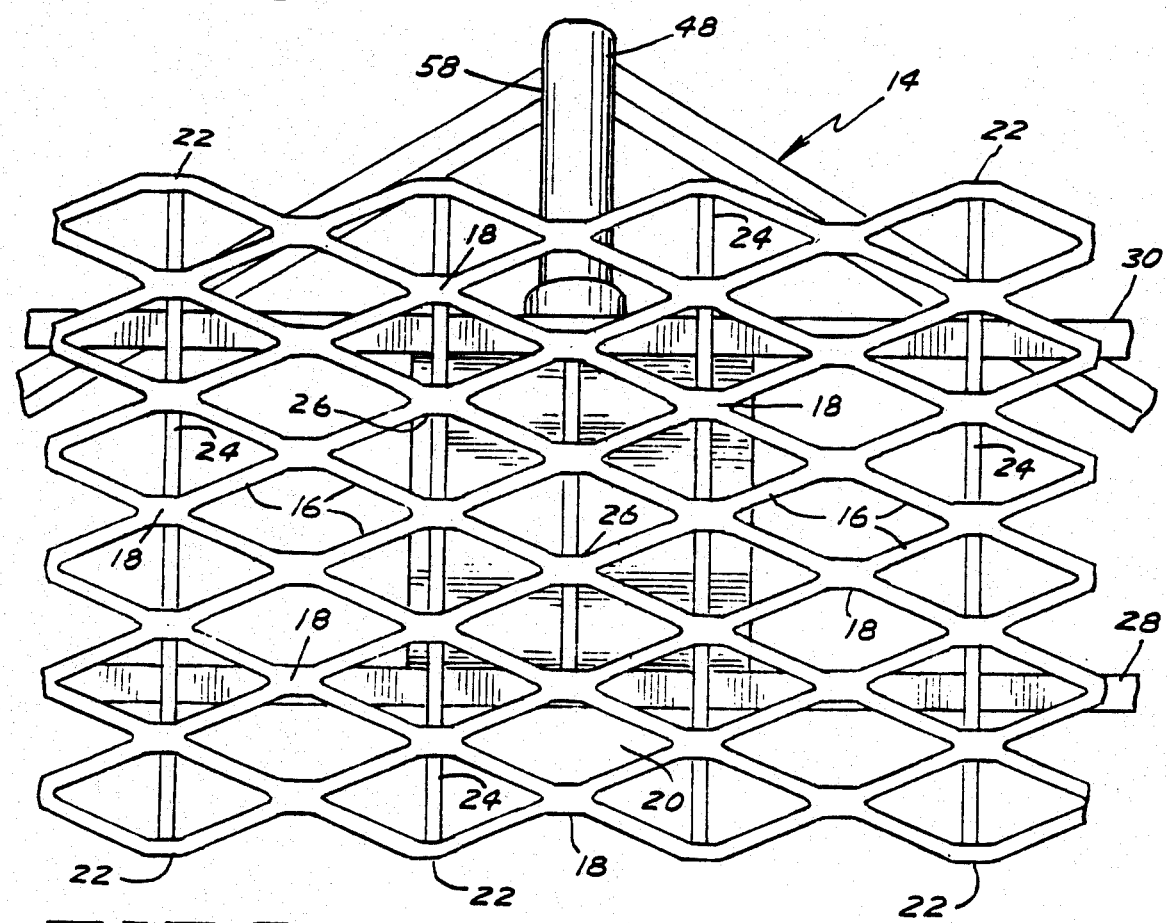
FIG. 5 is a bottom plan view corresponding to FIG. 3.

The leveling device exemplifying our invention has been generally denoted by the reference numeral 10. The device 10 comprises a head 12 preferably on the order of 30 inches by 7.5 inches. The head 12 includes a panel 14 of latticed material, more specifically of expanded metal having a multiplicity of criss-crossing flat strands 16 with cross-over regions 18 forming diamond-shaped openings 20. Attention is directed to the forward and rear edges of the panel 14, because these edges quite obviously do not include therein the cross-over regions 18. As can be seen from FIGS. 4 and 5, the forward and rear edges have strand portions 22 that project more forwardly and more rearwardly than any of the cross-over regions 18.

The panel 14 should be quite thin—actually only 3/32 inch. As the description progresses it will be seen that coarse and unwanted material, such as stones and clumps of clay, should be removed during the leveling procedure. With this in mind, the diamond-shaped openings have a length of 2.5 inches and a width of 1 inch. The flat strands 16 have a width of 3/16 inch, their thickness being 3/32 inch as mentioned above when referring to the thickness of the panel 14.

Of importance in obtaining the advantages of our invention is a plurality of laterally spaced ribs or fins 24, the fins 24 being parallel with respect to each other. The fins 24 have a height of one inch, a thickness of ⅛ inch and a lateral spacing of 3 inches. The lower edges of the fins 24 are welded at 26 to every other row of cross-over regions 18. It should be distinctly noted, though, that the forward ends and the rear ends of the fins 24 are secured to the projecting portions 22. This assures that the forward and rear edges of the panel 14 are fully reinforced. Thus, if the fins 24 were secured to the rows of cross-over regions 18 residing between those rows that are made use of for anchoring the panel 14 in place, the portions 22 would be unsupported and would be susceptible to being bent, or even broken, when the panel 14 strikes rocks and other obstacles as the device 10 is being moved back and forth.

The head 12 additionally includes a pair of transverse rods 28 and 30, preferably having a square cross-section. The rods 28, 30 are each welded at 32 to the upper edges of the fins 24 A bracket or angle member 34 has flange sections 36 and 38, the section 36 being welded at 40 to the transverse rod 28 and the section 38 being similarly welded at 42 to the transverse rod 30. In this way, an exceptionally rigid superstructure is produced, assuring that the lower edges of the fins 24 will reside in a single plane and at the same time assuring that the panel 14 of expanded metal is maintained in a flat or planar condition so as to impart a smooth and flat appearance to the surface of the soil being leveled.

A collar or sleeve 44 is welded at 46 to the flange section 38. The collar 44 receives therein the lower end of an upwardly and rearwardly inclining tubular handle 48, the lower end of the handle 48 being welded to the collar 44 at 50. Further strengthening the device 10 are a pair of braces 52 and 54 which have their lower ends welded at 56 to the transverse rod 28 and their upper ends welded at 58 to the sides of the tubular handle 48.

From the foregoing, it should be appreciated that the leveling device 10 is ruggedly and inexpensively constructed.

Having presented the foregoing description, it is thought that a general appreciation of the benefits to be derived from a practicing of our invention should be apparent. Nonetheless, an operational description should make certain that the benefits will be understood Therefore, a user 60 of our device 10 is pictured in FIG. 1 and is in the process of moving the device 10 back and forth across the loose soil 62 that is to be leveled.

In FIG. 2, a substantial amount of leveling has been achieved, so the more leveled ground has been given the reference numeral 62a, whereas the various small scoops or piles of soil that have been literally shovelled onto the upper surface of the expanded metal panel 14 have been given the reference numeral 62b. It should be distinctly understood that the lateral spacing of the fins 24 form channels therebetween for the accommodation and accumulation of the small soil piles 62b.

Thus, whenever the head 12 is moved forwardly, any coarse material is caused to ride onto the upper surface of the panel 14, the same result occurring when the head 12 is moved rearwardly. The jostling that transpires will cause whatever material contained in the small piles 62b to be sifted downwardly through the diamond-shaped openings 20, thereby being returned to the substantially leveled soil 62a therewith.

On the other hand, where stones, clumps of clay and other oversize material that are not readily broken up, and are too large to pass downwardly through the openings 20, are retained on the upper side of the panel 14.

In FIG. 3, the now leveled ground has been denoted by the reference numeral 62c, whereas the stones and sufficiently coarse material retained on the upper side of the panel have been given the reference numeral 62d. In other words, the head 12, as shown in FIG. 3, has been raised by the user 60 in the direction of the arrow 64, and the user 60 merely continues the lifting action with the coarse material 62d remaining on the upper surface of the panel 14. The user 60 then simply tosses the residual and unwanted material 62d into a receptacle or otherwise disposes of it.

It is quite important to appreciate the several benefits to be derived from the device 10. Whereas the planar condition of the panel 14 assures an excellent spreading and leveling of the soil 62, there is a concomitant gravitational sifting of whatever soil that is fine enough to pass through the openings 20 so that such material is returned to the soil being leveled. Prior art devices known to us simply do not achieve a sifting of the material and hence do not separate out materials of objectionable size that it should be removed or discarded.

While our invention possesses a considerable amount of versatility, particularly as evidenced from what has been depicted in FIGS. 1, 2 and 3, it carries with it an especially advantageous feature in that it can be employed in the grooming or dressing of golf course greens. Therefore, attention is directed at this time to FIG. 6 in which a portion of a golf green 66 is shown in section. Grass 68 has been presented for the sake of completeness. The soil has been labelled 70. Inasmuch as it is common practice to remove plugs from golf greens, in order to aerate the soil beneath the turf a plurality of cylindrical plugs 72 have been presented in FIG. 6, the removed plugs simply laying on the green 66, thereby leaving core holes 74.

While the removal of the plugs 72 enable the golf green 66 to be aerated they should be pulverized so that the soil constituting same ca be returned to the holes 74.

Figure 6:
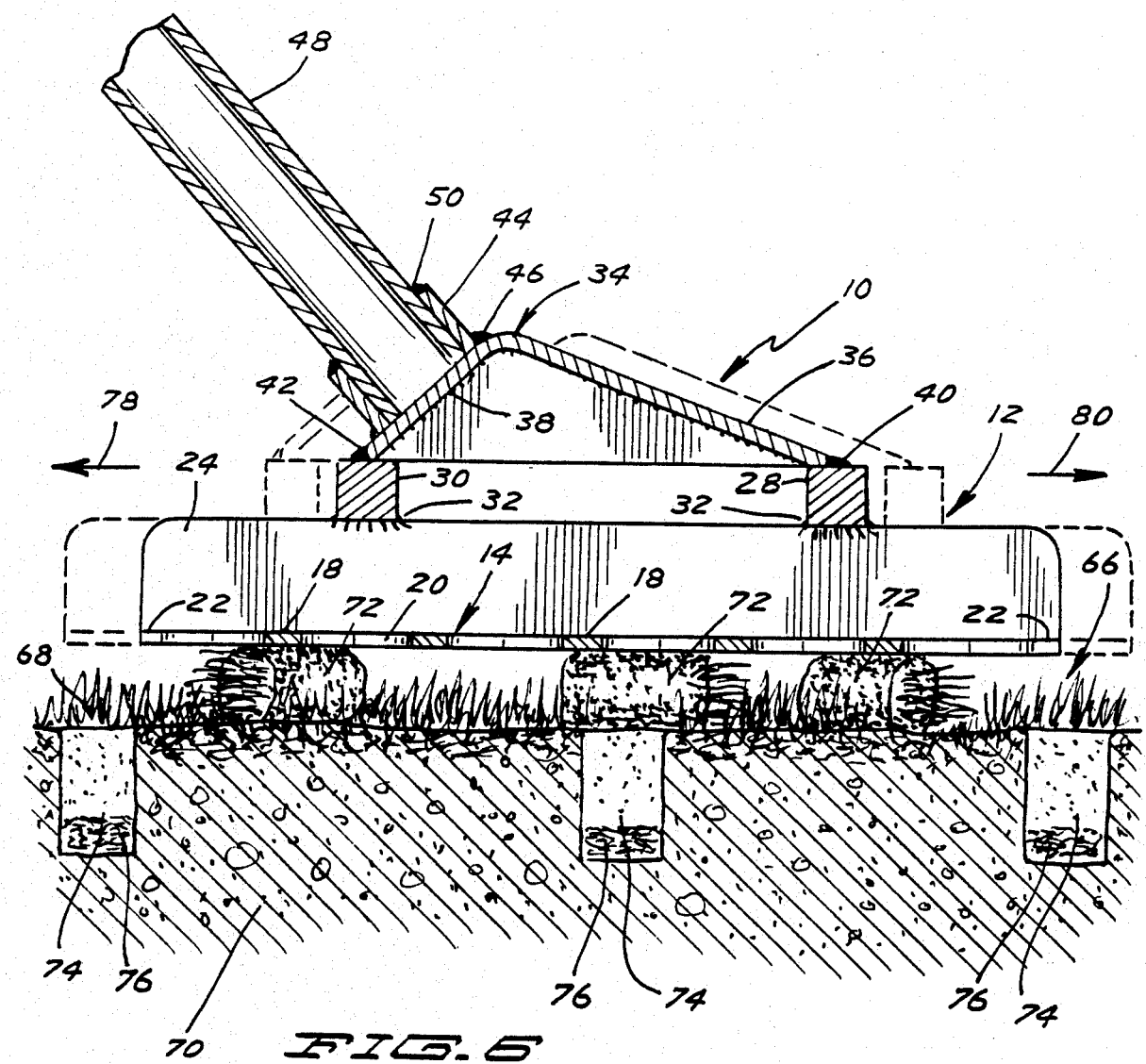
FIG. 6 is a sectional view taken in the direction of line 6—6 of FIG. 4 but with our device being used for pulverizing golf green plugs that have been removed for aerating purposes.

The holes 74 in FIG. 6 have been partially filled with soil 76 by reason of the back and forth movement of the device 10 as indicated by the directional arrows 78 and 80. As the head 12 is moved back and forth in the direction of the arrows 78, 80, the user 60 exerts a slight downward pressure that causes the plugs 72 to be pulverized. Some of the soil forming the plugs 72 is forced upwardly through the openings 20 and may not be immediately returned to the holes 74 but will be in a short period of time as the head 12 passes over the holes 74. In other words, the plugs 72, when broken up, are simply scraped along the upper surface of the green 66 until the pulverized soil from the plugs 72 is drawn over the holes 74. In this way, there is a redistribution of the soil from the plugs 72 so that the holes 74 are for all intents and purposes completely refilled by the time the user 60 completes his or her grooming or dressing operation.

We claim:

1. A leveling device comprising a flat panel of latticed material having a plurality of openings therein, a plurality of laterally spaced fins having their lower edges secured to the upper side of said panel to form side-by-side, open-ended channels so that soil may be scooped onto the portions of said latticed material residing between said fins, rigid means secured to the upper edges of said fins for maintaining the lower edges of said fins in a single flat plane and hence maintaining said flat panel in a single flat plane and handle means inclining upwardly from said rigid means whereby said device can be manually moved back and forth in both the leveling and sifting of soil.

2. A leveling device in accordance with claim 1 in which the latticed material forming said panel is of expanded metal.

3. A leveling device in accordance with claim 2 in which said openings are diamond-shaped.

4. A leveling device in accordance with claim 3 in which the longitudinal or longer axes of said openings extend transversely with respect to said fins.

5. A leveling device in accordance with claim 4 in which said expanded metal includes a multiplicity of cross-over regions, the lower edges of said fins being secured to certain of said cross-over regions.

6. A leveling device in accordance with claim 5 in which said panel includes strands extending between said cross-over regions and additional strands at the forward and rear edges of said panel having forwardly and rearwardly projecting portions, said fins being secured to said forwardly and rearwardly projecting portions and those cross-over regions therebetween.

7. A leveling device in accordance with claim 1 in which said panel has a thickness on the order of 3/32 inch.

8. A leveling device in accordance with claim 7 in which the lateral spacing of said fins is on the order of three inches so that material is channeled onto the upper side of said panel between said fins.

9. A leveling device in accordance with claim 8 in which said openings are diamond-shaped with a length on the order of 2½ inches and a width on the order of one inch.

10. A leveling device in accordance with claim 9 in which the lengths of said openings extend transversely with respect to said fins.

11. A leveling device comprising a plurality of laterally spaced and vertically oriented fins, a flat panel of expanded metal secured to the lower edges of said fins to form side-by-side, open-ended channels so that soil may be scooped onto the portions of said expanded metal residing between said fins, a pair of transverse rods secured to the upper edges of said fins at an elevation above said flat panel so that scooped soil may pass thereunder, an angle member having one flange portion secured to a central portion of one of said rods and having a second flange portion secured to a central portion of the other of said rods, and a tubular handle having one end thereof secured to said one flange portion.

12. A leveling device in accordance with claim 11 in which said panel of expanded metal has a thickness on the order of 3/32 inch so that some soil and other material is pushed onto the upper side of said panel as said panel is moved back and forth through the agency of said handle.

13. A leveling device in accordance with claim 12 in which said panel of expanded metal has diamond-shaped openings therein.

14. A leveling device in accordance with claim 13 in which said diamond-shaped openings have a length on the order of 2½ inches and a width on the order of one inch.

15. A leveling device in accordance with claim 14 in which the length of each opening extends transversely with respect to said fins.

16. A leveling device comprising a planar panel of relatively thin expanded metal having a plurality of diamond-shaped openings therein, said panel having relatively thin forward and rear edges in the same plane as said panel and being the same thickness as said panel, rigid means overlying said panel, and a plurality of relatively thin, laterally spaced vertical members extending between said rigid means and said panel, said vertical members being secured to said rigid means and to said panel for maintaining said panel in its planar condition, whereby when said panel is moved across loose soil to be leveled some of said soil is scooped onto the upper side of said panel by either of said relatively thin edges depending upon the direction of movement of said panel so that whatever portion of said scooped soil residing on the upper side of said panel that is fine enough to pass downwardly through said openings can do so.

* * * * *